United States Patent [19]

Galbierz et al.

[11] Patent Number: 5,125,506
[45] Date of Patent: Jun. 30, 1992

[54] CARRIERS OF MULTIPLES OF FLANGED CONTAINERS

[75] Inventors: Jerome J. Galbierz, Glendale; Richard T. Galbierz, St. Louis, both of Mo.; Michael L. Reinig, Naperville, Ill.

[73] Assignee: Imperial Packaging Inc., St. Louis, Mo.

[21] Appl. No.: 687,331

[22] Filed: Apr. 18, 1991

[51] Int. Cl.⁵ ............................................. B65D 75/00
[52] U.S. Cl. ................................................... 206/151
[58] Field of Search ......................... 206/145–154, 206/197

[56] References Cited

U.S. PATENT DOCUMENTS

| | | | |
|---|---|---|---|
| 3,317,234 | 5/1967 | Burford | 206/145 X |
| 3,432,202 | 3/1969 | Ebelhardt | 294/87.2 |
| 3,528,697 | 9/1970 | Wood | 294/87.2 |
| 3,601,253 | 8/1971 | Poupitch | 294/87.2 |
| 3,601,439 | 8/1971 | Poupitch | 294/87.2 |
| 3,912,075 | 10/1975 | Berry | 206/148 X |
| 3,959,949 | 6/1976 | Benno et al. | 53/35 |
| 4,018,331 | 4/1977 | Klygis | 294/87.2 |
| 4,136,772 | 1/1979 | Mascia | 206/199 |
| 4,190,149 | 2/1980 | Oliff | 206/145 |
| 4,219,117 | 8/1980 | Weaver | 206/150 |
| 4,273,273 | 6/1981 | Zenri | 294/87.2 |
| 4,432,579 | 2/1984 | Denmark et al. | 294/87.2 |
| 4,453,630 | 6/1984 | Helms et al. | 206/147 X |
| 4,621,734 | 11/1986 | Heijnen | 206/427 |

FOREIGN PATENT DOCUMENTS 2363493 3/1978 France ............ 206/151

Primary Examiner—William I. Price
Attorney, Agent, or Firm—Gravely, Lieder & Woodruff

[57] ABSTRACT

A fiber carrier for ringing beverage containers has upstanding walls to engage a flange or chime on a beverage container. The walls extend circumferentially around container engaging apertures in the carrier. The carrier may have concentric strengthening members, such as scores or corrugations surrounding the container engaging apertures. The carriers may be installed on arrays of beverage containers by automated or manually driven ringing machines. These machines index the carriers to locations which correspond to the location of an array of containers received in the machines. The machines have mechanisms to utilize preformed webs of joined carriers. The ringing machines position the carriers over an array of containers and force the carriers into ringing engagement with the arry. The fiber carrier may be compatible with modern disposal methods including incineration and biodegradation.

6 Claims, 9 Drawing Sheets

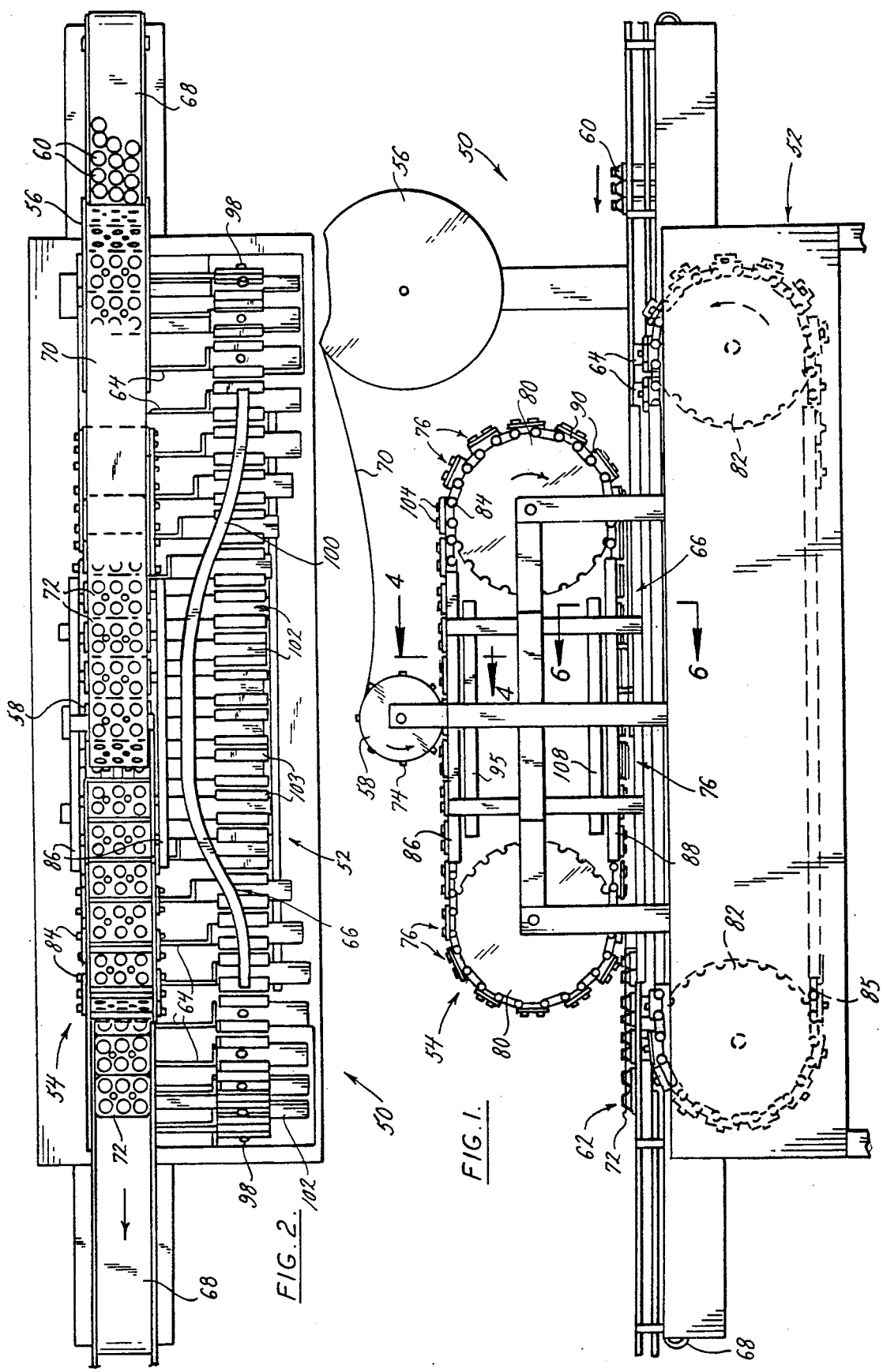

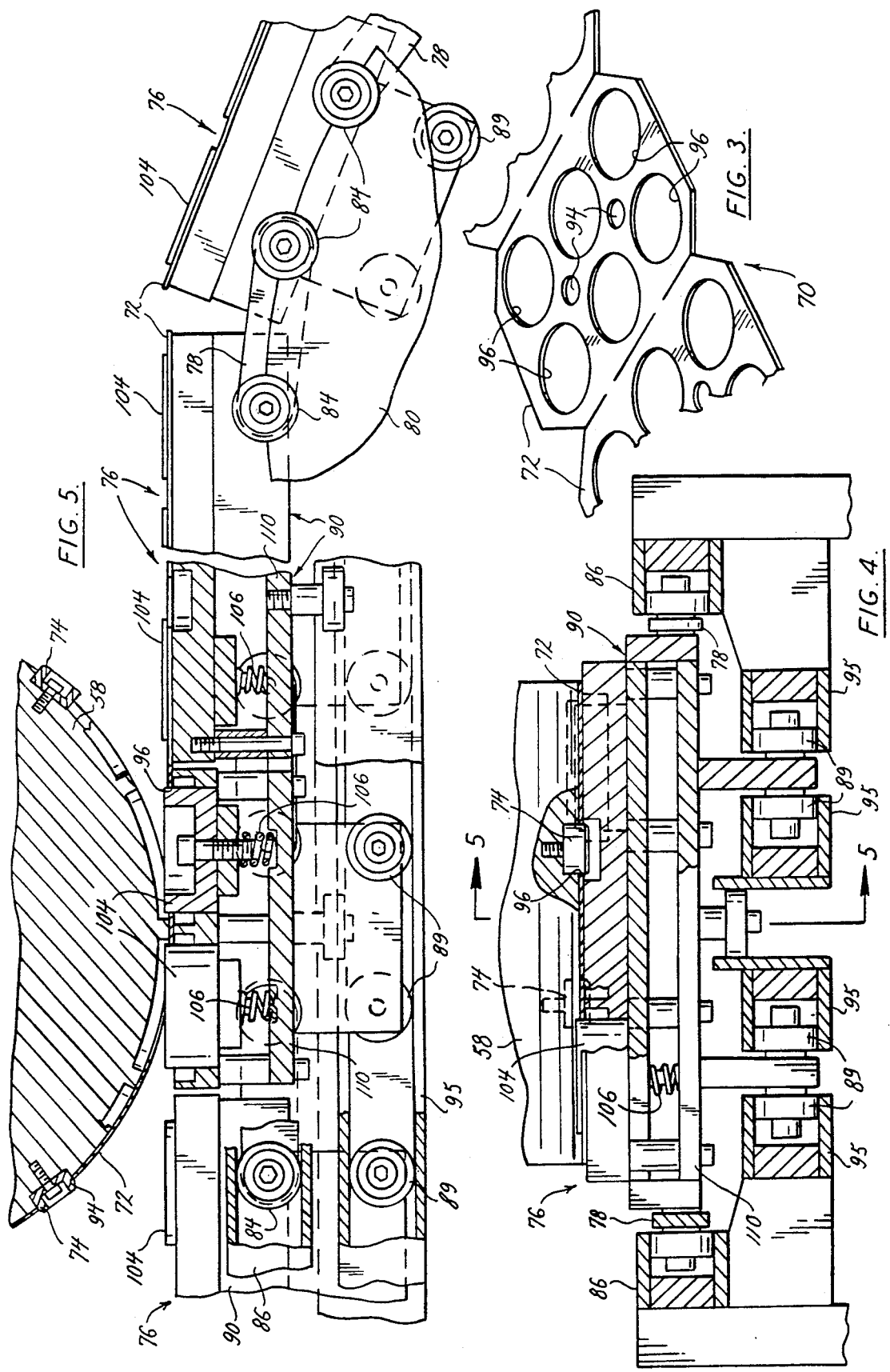

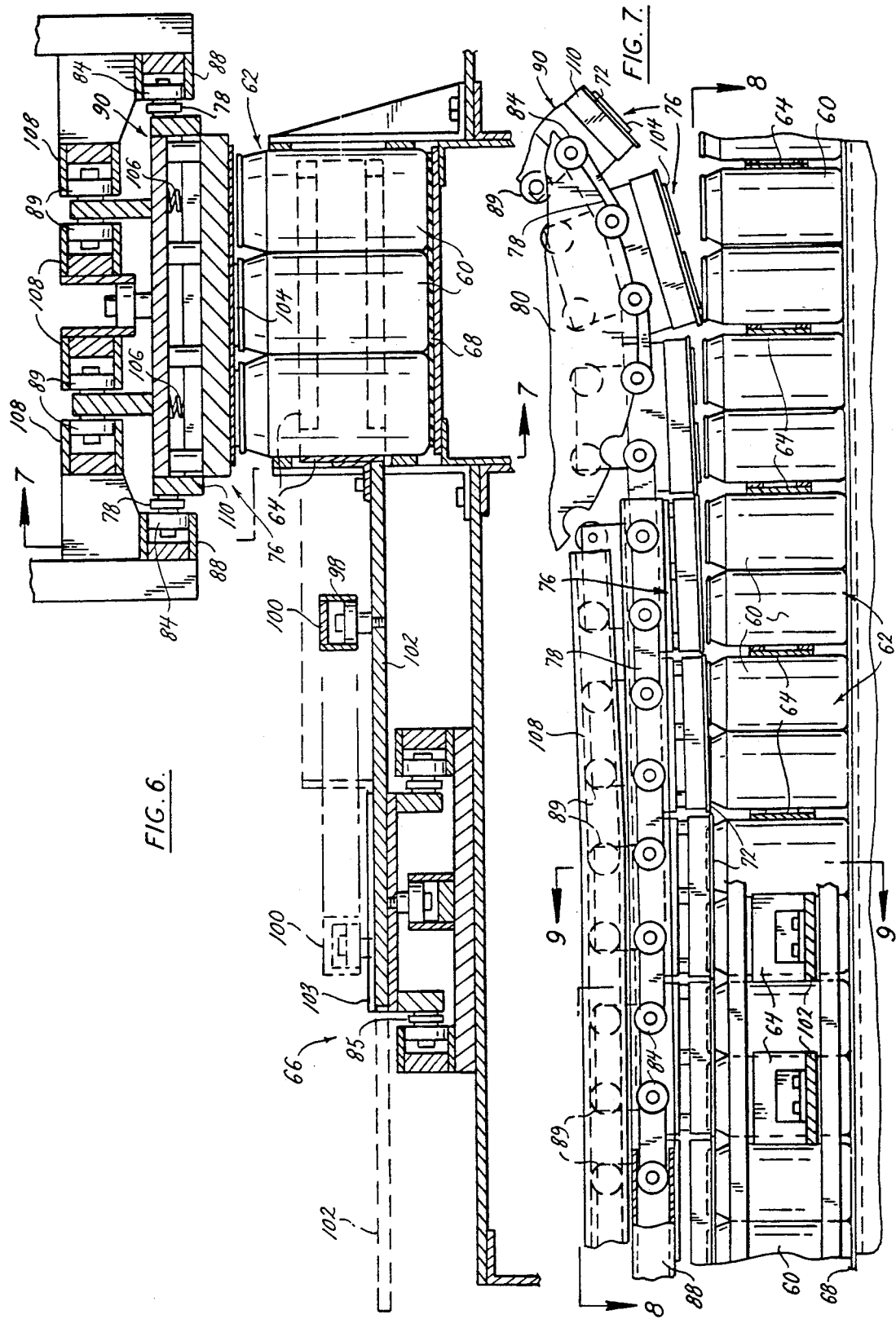

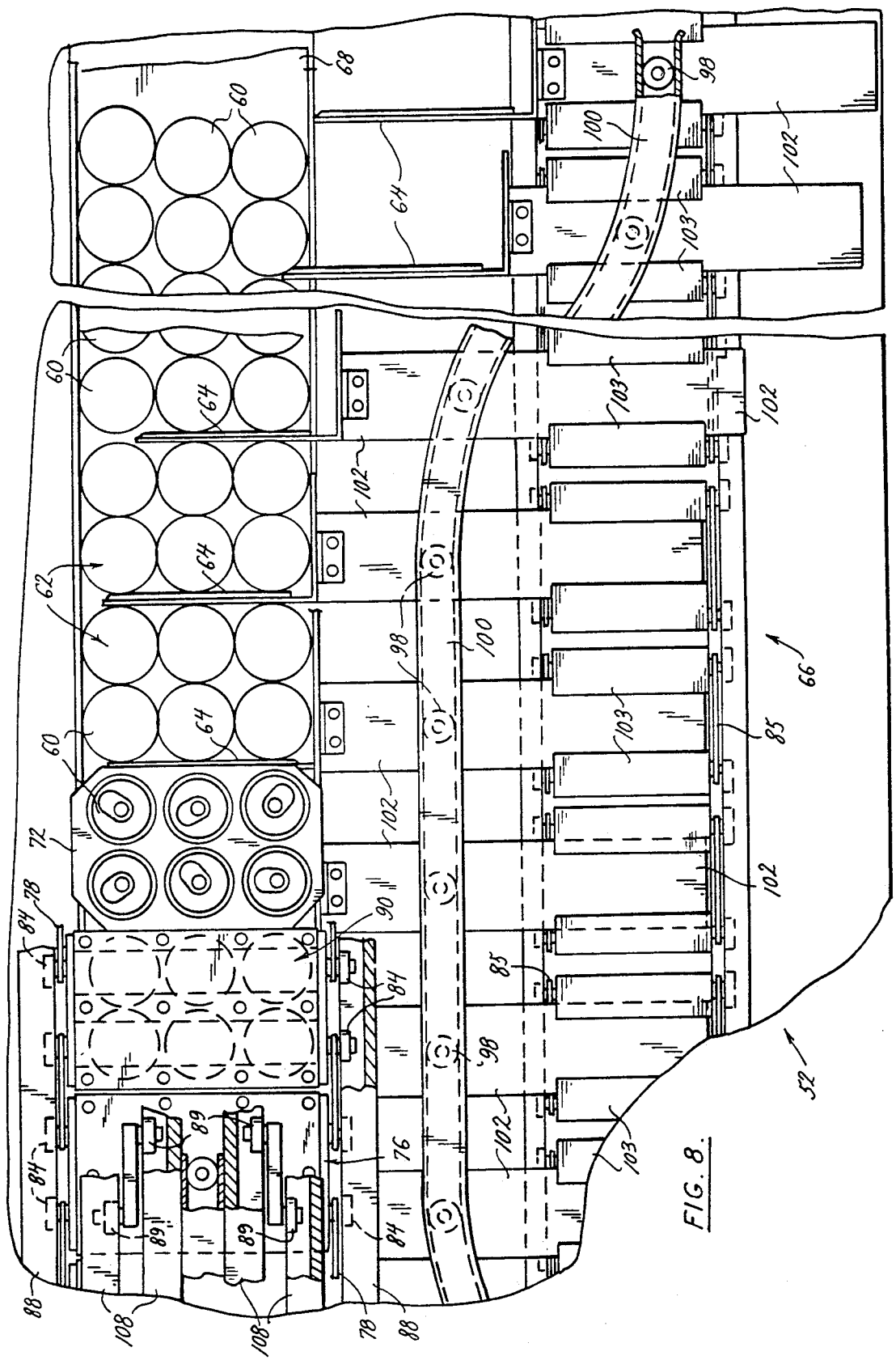

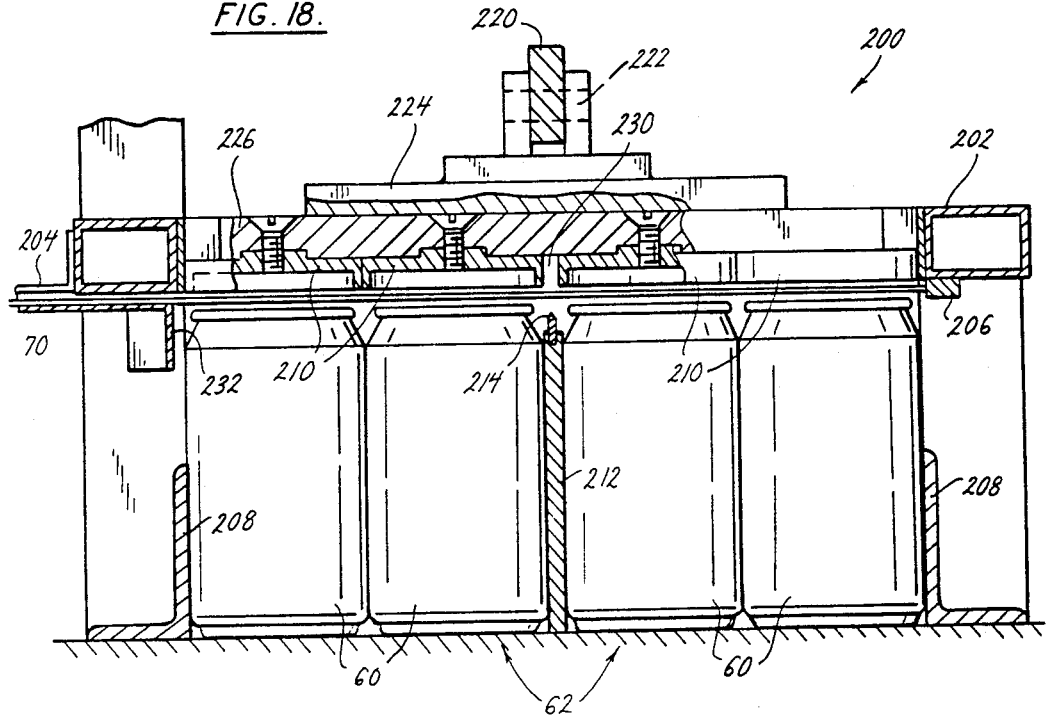
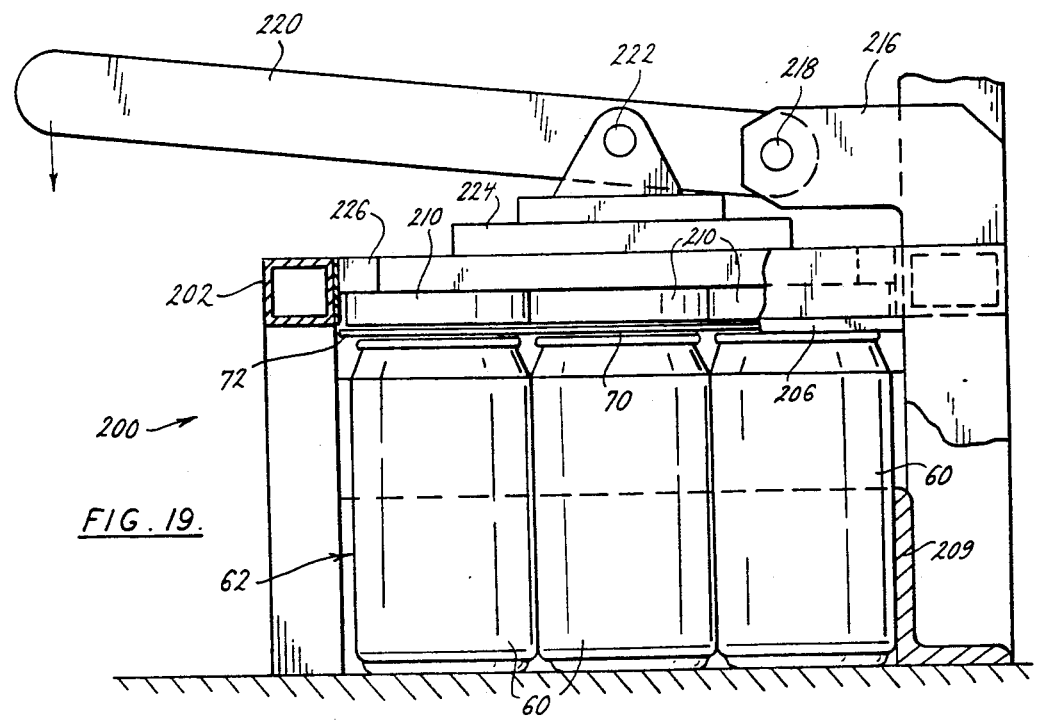

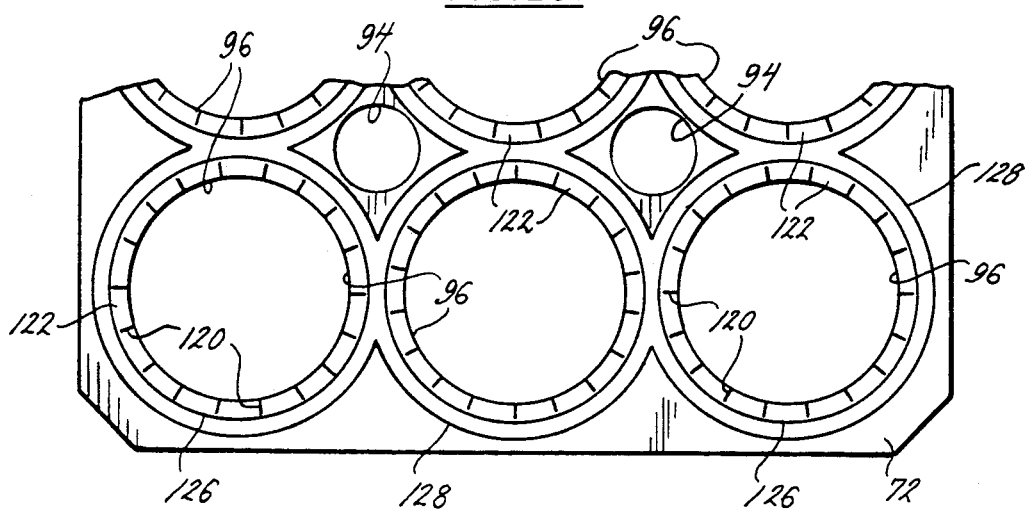
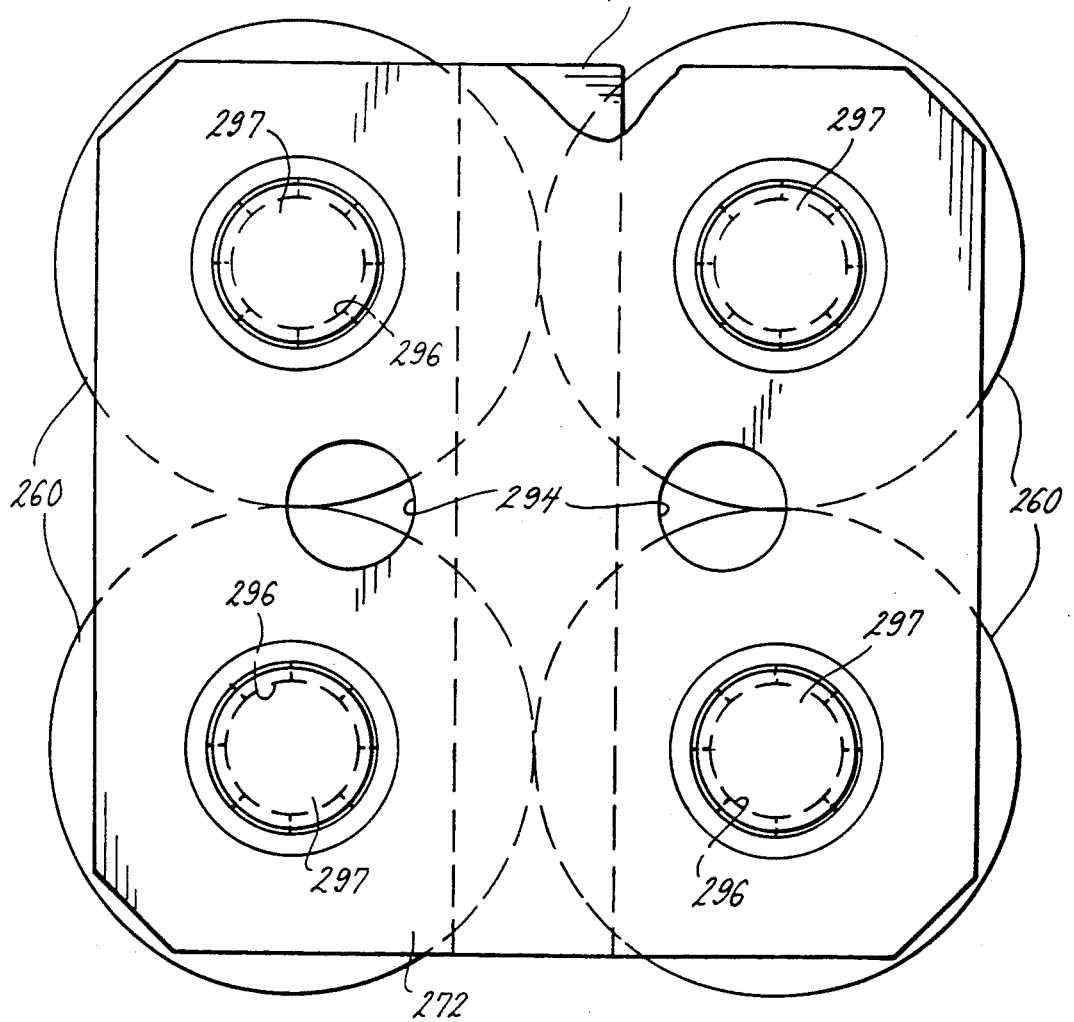

CARRIERS OF MULTIPLES OF FLANGED CONTAINERS

BACKGROUND AND SUMMARY OF THE INVENTION

This invention relates to carriers for flanged articles, and especially to carriers for beverage containers such as cans and bottles. Applicants are aware of the following patents, the disclosures of which are incorporated by reference herein:

| | | |
|---|---|---|
| 3,432,202 | 3,959,949 | 4,219,117 |
| 3,528,697 | 4,018,331 | 4,273,273 |
| 3,601,253 | 4,136,772 | 4,432,579 |
| 3,601,439 | 4,190,149 | 4,621,734 |

Four considerations have influenced the present invention and the development of applicants, carriers for flanged articles reduction in the amount and/or cost of materials making up the carrier, adaptability to high-speed machine application in container filling and packaging lines, compatibility with existing containers and packaging practices, and consideration of the environmental impact of the carrier throughout the entire use cycle, from production of its constituent materials through final disposal.

Paper is derived from a renewable resource. It is inexpensive, recycleable, cleanly combustible, and biodegradable. It is therefore an object of this invention to employ paper as the primary constituent of the carrier, preferably in the form of paperboard. To further the effort to recycle containers used with the carrier, it is an additional object of the invention, and of designs which practice the invention, to preserve the integrity of the carrier sufficiently when containers are removed that it can easily accept and retain empty containers and make their return convenient.

Unless it can completely replace existing methods and equipment, an innovation must harmonize with everything it cannot supplant, or it will fail to be adopted. It is therefore a further objective of this invention that it be adaptable to existing packaging machinery and practices and accommodate present and foreseen future container designs. In addition, applicants have developed equipment and methods specifically compatible with their carrier.

The following discussion is in terms of a modern necked beverage can, which has a cylindrical body fairing into a tapered section which reduces the diameter sufficiently that a lid sealed onto the top will have an overall diameter no larger than that of the cylindrical part of the body. However, it will be appreciated that the invention can use cylindrical cans by putting spacers in the can array and by placing the carrier holes further apart, as described herein. Similarly, the invention works equally well with bottles.

Applicants' invention in a beverage carrier uses a sheet of paperboard which is diecut with an array of circular holes, such as a rectangular array. Such an array matches the normal arrangement of cans in a carton or case and leaves uncommitted spaces within the array where finger-grip holes for handling the package can be located. Center-to-center spacing of the array is preferably (but not necessarily) equal to the major diameter of the container for which the carrier is designed, such as for necked cans. This feature partially relieves the paperboard sheet from the bending moment imposed by container weight, for when the containers' sides touch, their tendency to twist out of engagement with the carrier holes is greatly reduced. Plain cylindrical cans may also be used with suitable spacing for finger holes.

As further described herein, in relation to the preferred embodiment of this invention, the stock from which the carrier may be formed is preferably solid paperboard. The paperboard may be laminated for additional strength or decoration or may also be coated by clay coating or conventional methods of applying printable surfaces to paper. The carrier may have additional strengthening placed around the container holes, as described herein. The holes may be circular and may have a surrounding ring embossed in the paperboard. Numerous cuts form a series of projections or fingers that snap under a can flange, or other container chime, to hold the container. To prevent loss of the container completely through the sheet, the internal diameter of the surrounding ring is preferably less than the sum of twice the paperboard thickness and the container body diameter. To conserve strength in the areas between two opposed apertures, the cuts may be arranged to avoid the close approach of cuts from two adjacent apertures, as shown herein.

The design in the choice of finger width is not critical, however, too narrow fingers may buckle or twist under axial loading and provide little retaining force on the container. Too wide fingers may transmit sufficient torque to the sheet to make its edge ripple and corners turn down. With paperboard thickness adequate for 12-ounce cans, applicants have found that a width of twenty degrees of the circumference of the hole avoids both problems.

In the present invention the addition of a second ring embossed concentrically around the first ring mentioned above, as described herein, surprisingly provides a compliant member or area to take up the deformation at the base of a finger. This supplies a spring force to maintain the fingers in engagement with the container, and stiffens the surrounding sheet to minimize distortion from the desired planar shape. It is unnecessary to extend the outer embossed ring completely around an aperture, since the forces between adjacent apertures typically balance and reflect no torque on the sheet.

Scored lines which define hinges and bends in the prior art weapon any paper carrier and promote moisture absorption at those points, so that heavier material or more of it is required to insure safe carriage of the product. Embossing largely preserves the surface of the paperboard and reduces the material needed to produce a carrier.

Forming of the carrier from a flat sheet (with minor bumps of the embossed rings around the holes) facilitates preparation from roll stock and application to containers right in a packaging line at speeds compatible with modern equipment and material handling methods. For example, the edge of the flat carrier sheet can overlap the edges of adjacent carriers to permit stacking of interlocked groups for transportation, pallet storage, stacking in cold vaults, or retail display. In addition, the fingers retain sufficient strength even after containers have been removed to accept and hold empty containers and encourage their return for recycling. The upright posture of the fingers and the containers eliminates drainage of remnant beverages or rinse water, and the stacking of interlocking groups makes it convenient and tidy to accumulate a reasonable number in a given space.

Application of carriers to containers is not restricted to six packs in high-volume, high-speed situations. The same carrier configuration is suitable for different numbers and other sizes of containers, although the invention works best with containers whose body diameter is larger than the flange or chime diameter by enough to accommodate the array of fingers and the embossed rings on which they are based, as in bottles and beverage cans. Besides the traditional 6-pack, the present invention works for 2-, 3-, 4-, 8-, 9-, 12-, 15-, 18- and 24-packs. Formed roll stock that feeds high-speed machines can also be used by simple manually-operated machines scaled to smaller volumes of product handled by distributors or retailers or by large machines and methods, as described herein.

Besides the recycling advantages of paper, dispensing with plastics derived from petroleum promotes independence of an imported raw material and removes a significant hazard to fish, waterfowl, and other wildlife known to be injured or killed by the joined plastic rings which represent the present standard of grouping flanged containers.

It is thus an object of this invention to produce a carrier for beverage containers which is usable by both large and small scale carrier installing machines.

It is an object of this invention to produce carriers for beverage containers which can be made from web stock and applied as a continuous web in a beverage container ringing process.

It is an object of this invention to produce a carrier for beverage containers from environmentally safe and degradable paper stock.

It is an object of this invention to produce a carrier for beverage containers which incorporates additional aperture strengthening structure.

It is an object of this invention to produce carriers which can be conveniently disposed of by biodegradation and/or incineration.

It is a further object of this invention to produce a machine capable of installing carriers for beverage containers in a modern beverage producing line.

It is an object of this invention to produce a machine for installing carriers for beverage containers which is inexpensive to build and purchase and which may be used on a small scale and powered by hand.

It is a further object of this invention to produce a machine for installing carriers for beverage containers which has positive locating, indexing and transfer of the carriers and the beverage containers.

It is a further object of this invention to produce a machine for installing carriers for beverage containers which has positive transfer pilots for indexing and locating the carriers in relation to the beverage containers.

Other objects and features of the invention will be apparent from the following Description of the Drawings, the Drawings and the Description of the Preferred Embodiments.

DESCRIPTION OF THE DRAWINGS

FIG. 1 is a side view of a machine, according to the invention, for applying applicants, carrier, FIG. 2 is a top view of the machine shown in FIG. 1, FIG. 3 is a partial view of a carrier web, according to the invention, for use in the machine of FIG. 1, FIG. 4 is a partial view of the machine of FIGS. 1 and 2 showing a web therein, FIG. 5 is a cross-sectional view taken along the plane of line 5—5 in FIG. 4.

FIG. 6 is a partial view of the machine of FIGS. 1 and 2 showing an array of cans therein, FIG. 7 is a cross-sectional view of the machine of FIGS. 1 and 2 taken along the plane of line 7—7 in FIG. 6, FIG. 8 is a partial cross-sectional view of the machine FIG. 18 is a partial cross-sectional view of the machine of FIG. 16, FIG. 19 is a further partial cross-sectional view of the machine of FIG. 16, FIG. 20 is a partial top plan view of a modified carrier according to the invention, and FIG. 21 is a partial top plan view of an additional carrier according to the invention.

DESCRIPTION OF THE PREFERRED EMBODIMENTS

Figure 15:
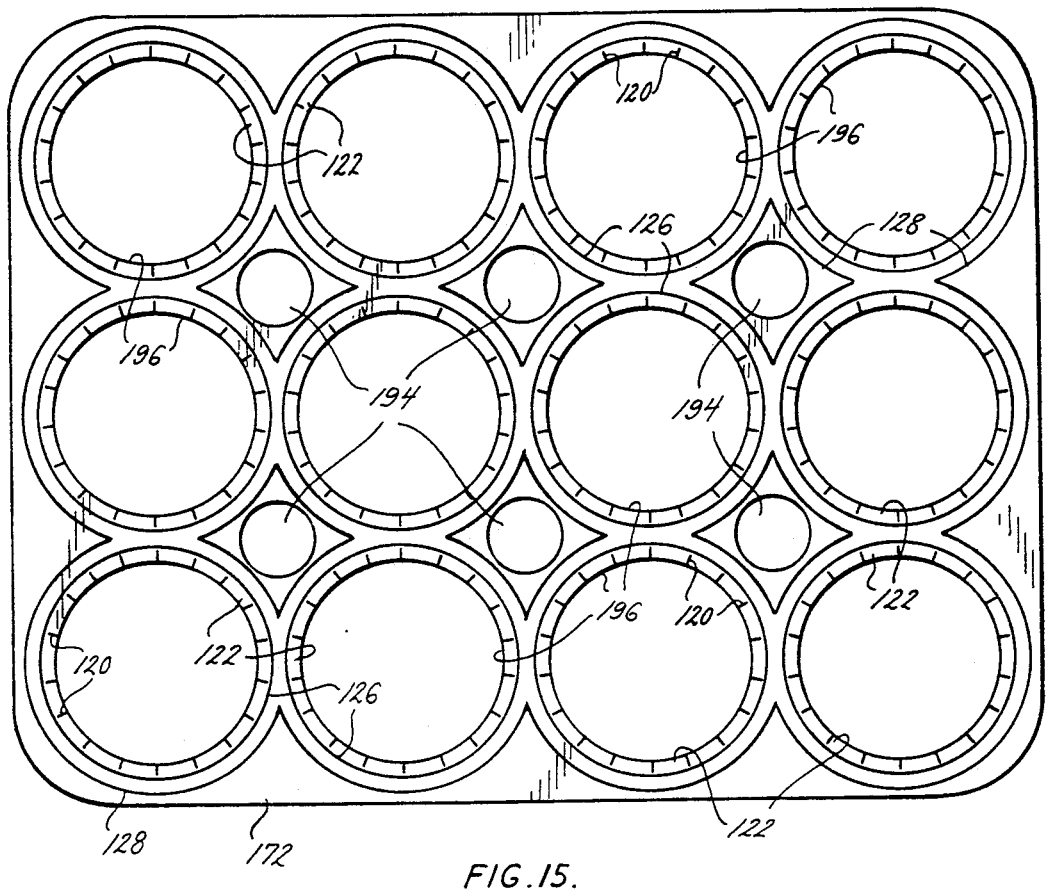
FIG. 15 is a top plan view of a carrier of the invention.

Referring to the drawings, in FIGS. 1 and 2 is shown a machine for applying the carriers of the invention to arrays of beverage containers such as cans or bottles. As shown in FIGS. 1 and 2 the carrier applying machine 50 has a lower array accumulating and positioning section 52 and an upper carrier applying section 54. Carrier applying section 54 takes web carriers from a roll of web 56 and transfers the web to the carrier applying section 54 by a timed transfer roll 58 as described herein. The array accumulating section 52 of machine 50 may be of a conventional design timed with carrier applying section 54. In a preferred embodiment herein the array accumulating section 52 is a machine of the invention described and shown herein which accepts beverage containers from a beverage filling line, not shown, and accumulates the beverage containers as 60 into arrays 62 on which the carriers 72 of the invention are installed. Arrays 62 may be any multiple, typically from 2 to 24, of beverage containers, but will most commonly be the 6 or 12 unit arrays common in the beverage art.

As shown in FIG. 2, the arrays 62 of beverage containers 60 are accumulated via can positioning members 64. As shown in FIG. 8, members 64 are moved into a mass of cans 60 by a cam guide system 66. Cam guide system 66 is shown in FIG. 2, for example, as operating from one side of the machine section 52, it will be appreciated that a dual cammed machine can also be used in which a plurality of cams 62 engage cam positioning members 64 operating from both sides of the machine 52. In the interest of clarity, the slide support system, as shown in FIG. 2, is abbreviated. It will be appreciated that slides 65 which propel can positioning members 64, as shown, will be supported throughout their travel, as is shown in the art.

As the arrays 62 of beverage containers 60 are accumulated and fed through the bottom section 52 of machine 50, on a conveyor 68, a web 70 of carriers 72 is fed through the upper section 54 of machine 50 and timed to match the transition of arrays 62 through the machine 50. Web 70 is fed from a roll 56 and passes over positioning roll 58 which positions the web 70 on the upper section 54 of machine 50. Positioning roll 58 has a series of spaced pilots 74 which engage web 70, as described herein. Upper section 54 of machine 50 also has a set of stations 76 mounted on chain mounts 78. Chain mounts 78 pass over two sprockets 80 which drives the chains over a closed path which may be clockwise as shown in FIG. 1. The drive rate for chain 78 is timed by suitable direct linkage to correspond to the rate of passage of arrays 62 through the lower portion 52 of machine 50. It being understood, and as shown in FIGS. 1 and 2, that the transfer rate of arrays 62 through section 52 is governed by the can positioning members 64 which are driven by a set of sprockets 82 which drive chains 85 on which can positioning members 64 are mounted.

As shown in FIG. 5, drive chains 78 have roller guides 84 which pass through upper guides 86 and lower guides 88, as described herein. Each of stations 76 incorporates a set of stripper assemblies 90 which receive the web 70 from the transfer roll 58. As shown in FIG. 3 web 70 is formed to correspond to the array of beverage containers accumulated in machine 50 with individual carriers being separated by scorelines 92. Scoreline 92 is through the thickness of web 70 leaving a small portion of the web intact as the stations 76 advance along chain 78 over sprocket 80, as shown in FIG. 1. The separation of stations 76 around the circumference of sprocket 80 ruptures the web along scoreline 92 creating separated individual carriers 70. The separated carriers are then positioned over the array 62 formed in the lower section 52 of machine 50, and a carrier 72 is installed on an array by strippers 90, as described herein. The completed array with the installed carrier 72 is then transferred out of the machine on conveyor 68, as shown in FIGS. 1 and 2.

Scoreline 92 is made up of a series of scores which extend through web 70. The scores may vary in number and length, as known in the art. The purpose of the scores is to weaken the web 70 sufficiently that the web reproducibly separates cleanly along scoreline 92 when stations 76 travel around sprocket 80. However, the web 70 should retain sufficient strength at the scoreline 92 to retain the integrity of web 70 prior to separation of stations 76 on sprocket 80. We have found that linear scores on the order of 92 and 98% of the width of web 70 are sufficient, preferably about 97%.

Referring in more detail to FIGS. 4 and 5, as the web 70 passes over transfer roll 58 pilots 74 on transfer roll 58 engage the finger holes 94 in each carrier 72. As the transfer roll 58 passes web 70 over stations 76 stripper assemblies 90 engage holes 96 in carriers 72 and strip the web 70 from transfer roll 58, as described further herein. During this portion of the operation chain 78 is guided through guides 86 at the upper portion of section 54 by rollers 84. Stripper assemblies 90 also have a set of cam rollers 89 the operation of which is described herein. In the upper portion of section 54, guides 95 engage cam rollers 89, as shown in FIG. 4, to stabilize stripper assembly 90. Situations 76 traverse around sprocket 80, as shown, in a clockwise direction and pass over the array 62 of beverage containers which have been accumulated in section 52 of machine 50. In the lower portion of section 54 rollers 84 engage guides 88 which control the elevation of stations 76. During the operation of section 54 lower section 52 acts to accumulate arrays 62 of beverage containers 60, shown here as necked cans, though the operation is essentially the same for bottles or standard cylindrical cans. As conveyor 68 passes through section 52 it is driven by chain 85 over sprockets 82 operating in a counterclockwise direction as shown in FIG. 1.

Chain 85 has mounted thereon a series of cam followers or rollers 98 which engage camming surface 100. Mounted on rollers 98 are a series of slides 102, each of which has at its upper extremity, as shown in FIG. 2, a can positioning member 64 which acts as a sliding fence and stop to accumulate and position arrays 62 of beverage containers. As chain 85 advances through machine 52 rollers 98 engage camming surface 100 which slides elements 102 into the machine pressing can positioning members 64, at spaced locations, through the mass of cans 60 to accumulate the desired arrays of beverage containers 60, as shown. It will be appreciated that other sizes of arrays can be accumulated, but the six unit array is representative. The arrays 62 are held by can positioning members 64 and pass in unison therewith through machine section 52. Chain 85 is timed and driven, for example by direct linkage or other conventional means, to correspond to the transit of carriers 72 on stripper assemblies 90 and are indexed so that carriers 72 and holes 96 therein are positioned directly above the tops of beverage containers 60, as shown.

Figure 9:
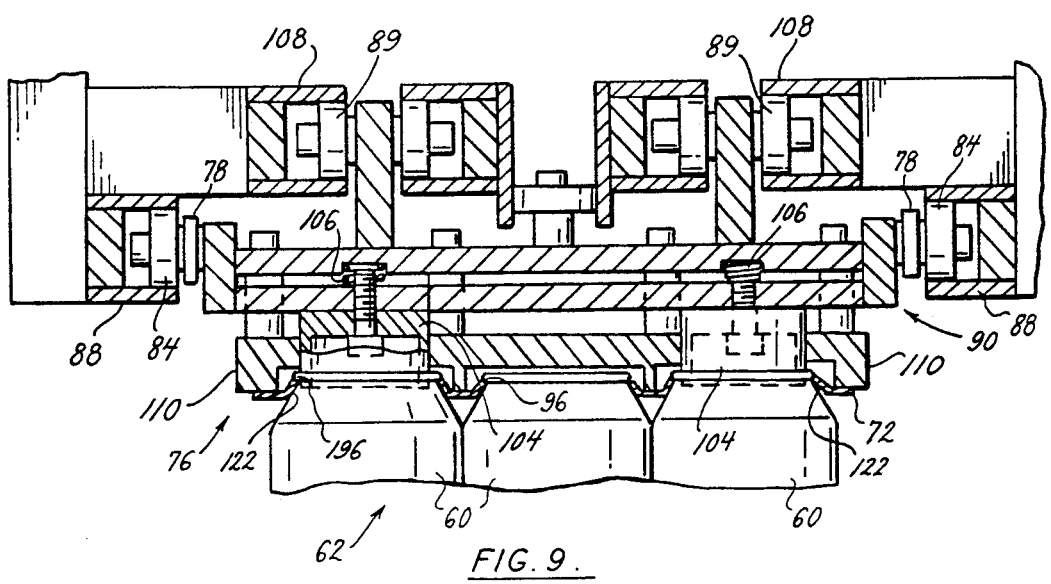
FIG. 9 is a partial cross-sectional view of the machine of FIGS. 1 and 2 taken along the plane of line 9—9 in FIG. 13.
Figure 10:
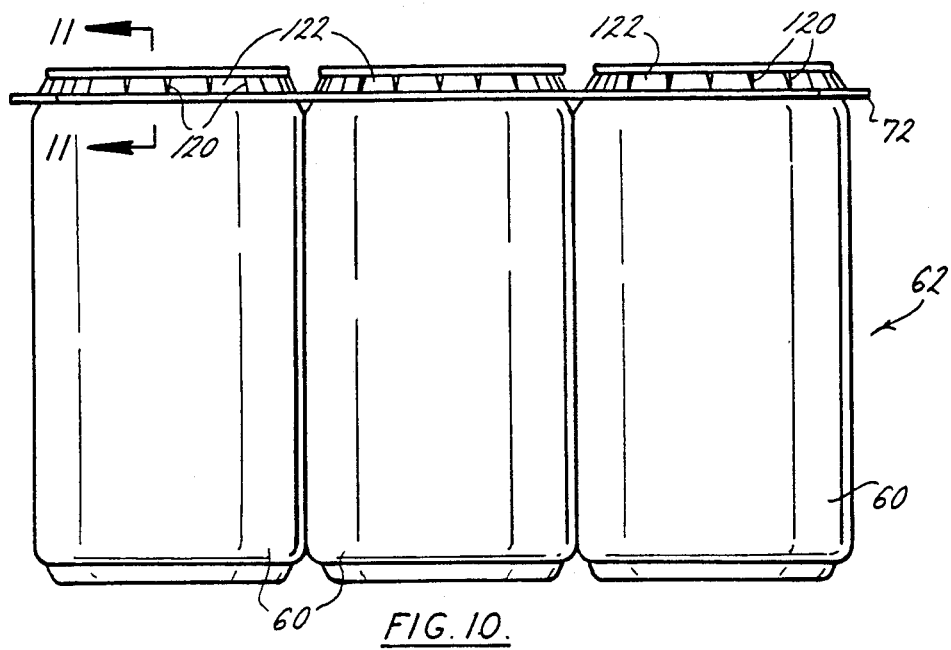
FIG. 10 is a side view of an array of cans held in the carrier of the invention.

It will be appreciated by those skilled in the art that FIGS. 2 and 9 have been abbreviated for clarity. Slides 102 may be supported throughout the full range of their travel by suitable bearings or other members, not shown. Further the length of slides 102 may be chosen to be sufficiently long that guides 103 remain fully in contact with slides 102 over the full extent of the travel of slides 102.

As further shown in FIGS. 6 and 9, when carriers 72 are positioned above arrays 62 camming surface 108 activates stripper assembly 90 to force carrier 72 down over the tops of the beverage containers 60 in array 62 to form a completed assembled array and carrier. Camming surface 108 is located in the lower portion of upper section 54 of machine 50, as shown in more detail in FIG. 9.

The operation of stripper assemblies 90 may be understood more fully by reference to FIGS. 1 and 9. As shown in FIGS. 1, web 70 is transferred to transfer roll 58 where pilots 74 engage finger holes 94 of web 70. Transfer roll 58 rotates in a counter clockwise direction, as shown in FIG. 1, with web 70 passing over transfer roll 58. As web 70 passes beneath transfer roll 58, holes 96 in web 70, the beverage container engaging holes, are engaged over a second set of pilots 104 which are a part of stripper assembly 90. Section 110 are biased downwardly by springs 106, as shown in FIG. 5, so that the pilots 104 project into holes 96 of carrier 72 when receiving carriers 72 from transfer roll 58. Stripper assemblies 90 are part of stations 76 and chain 78, as shown, and travel with chain 78 around section 54 of the machine 50. At the bottom of section 54 the stripper assemblies 90 engage and are indexed with arrays 62 of beverage containers 60.

As the arrays 62 and stripper assemblies 90 pass through the lower portion of section 54, and the upper portion of section 52, rollers 84 on traveling chain 78 engage a guide track 88 which stabilizes stations 76 and the stripper assemblies 90. Simultaneously, rollers 89 engage camming tracks 108, as shown in FIG. 9. Camming tracks 108 force stripping sections 110 of stripper assemblies 90 down against carrier 72 and force the carrier 72 into engagement with the beverage containers 60 of array 62, as shown in FIG. 9, to install the carrier 72 onto the array 60. As chain 78 and stripper assemblies 90 pass further through section 54 rollers 89 and camming track 108 disengage stripping sections 110 and stripper assemblies 90 return to their original configuration with stripping sections 110 once again retracted by springs 106 and pilots 104 are again ready to reengage additional portions of web 70, as described herein. As shown in FIG. 9, pilots 104 may be sized to be received into the inner diameter of a can chime or flange to provide additional indexing and locating function. As the conveyor 68 of section 52 continues its travel the arrays 62 of beverage container 60, with installed carriers 72, exit from the machine 50 and are ready for further processing and transportation to the point of sale.

Figures 11, 13, 14:
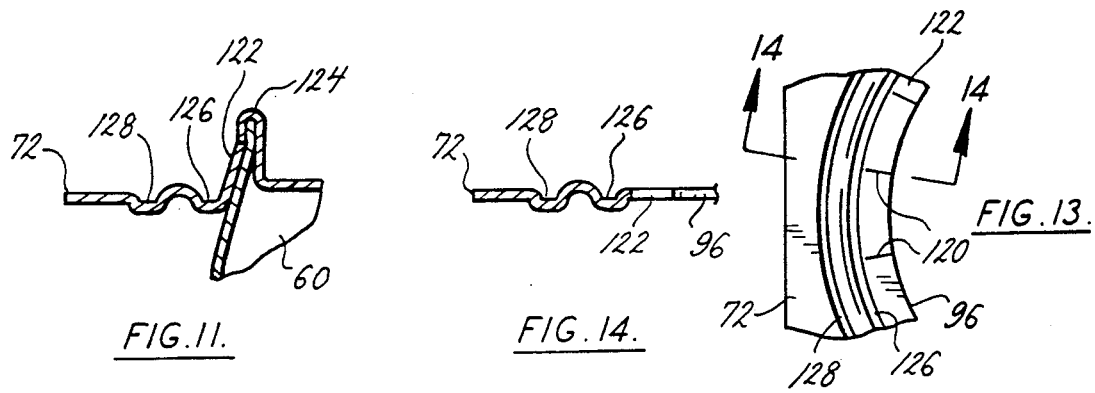
FIG. 11 is a partial cross-sectional view of the can and carrier taken along the plane of line 11—11 in FIG. 10.
FIG. 13 is a detail view of the carrier of FIG. 12.
FIG. 14 is a partial cross-sectional view of the carrier of the invention taken along the plane of line 14—14 in FIG. 13.
Figure 12:
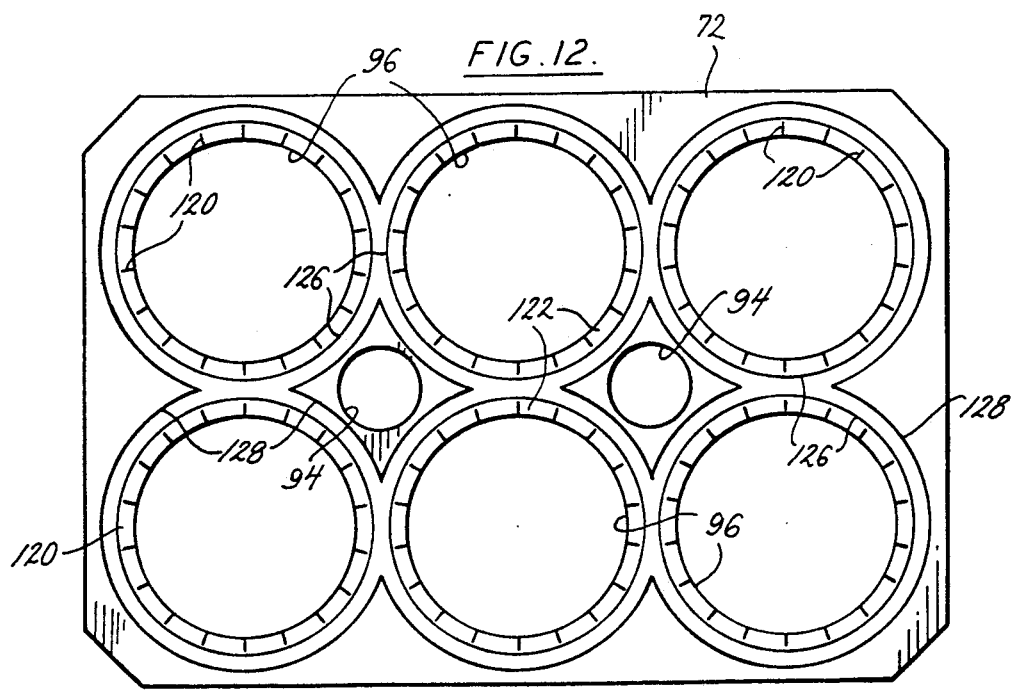
FIG. 12 is a top plan view of a carrier of the invention.
Figure 16:
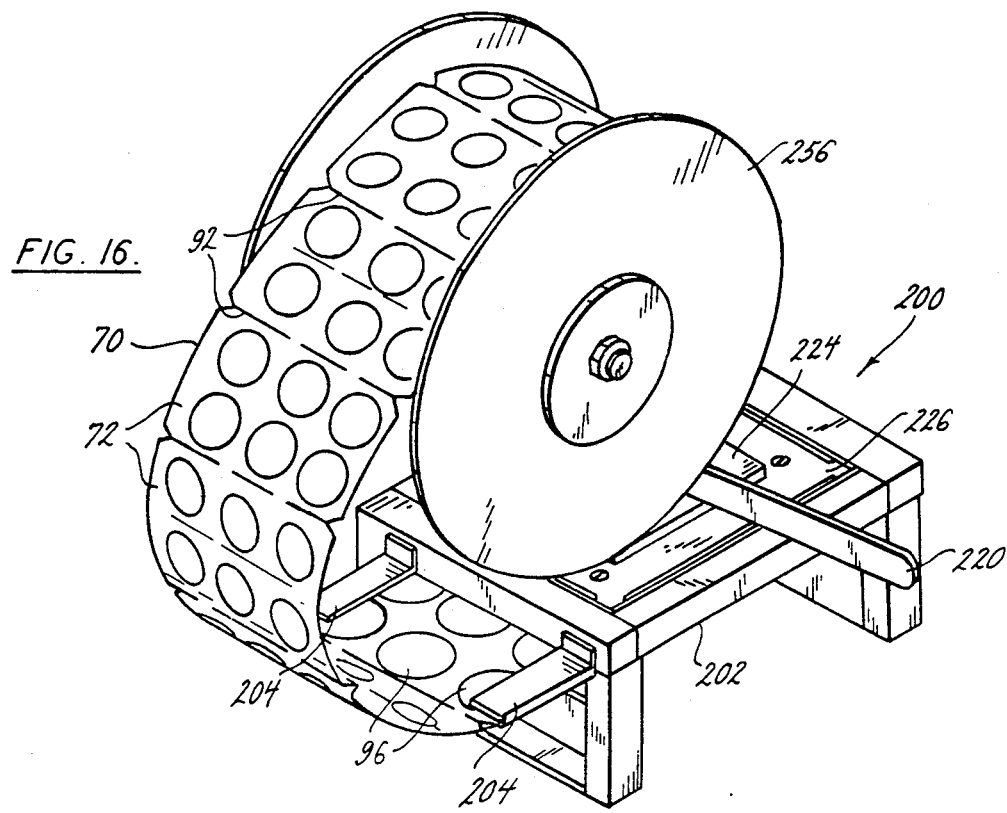
FIG. 16 is a perspective view of a manually operated ringing machine according to the invention.
Figure 17:
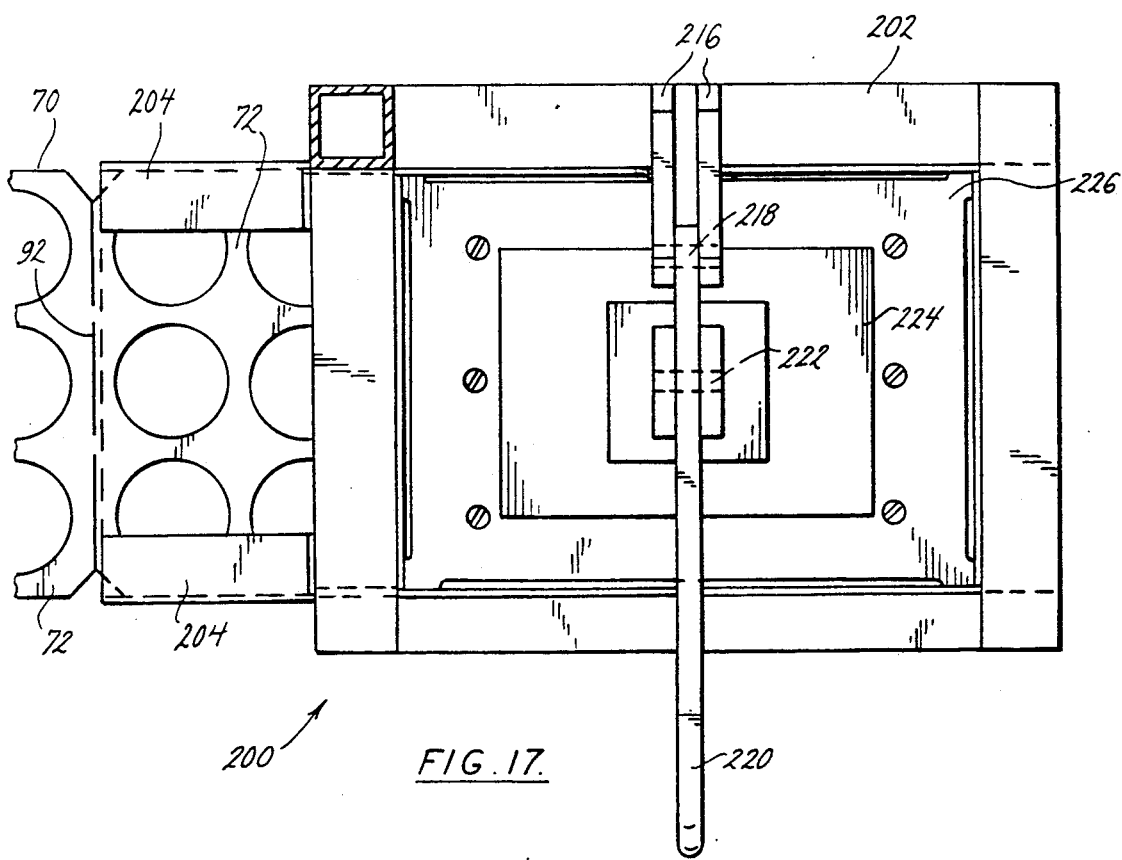
FIG. 17 is a partial top plan view of the machine of FIG. 16.

Referring in more detail to FIGS. 10 through 15, 20 and 21, the carrier 72 of the invention may be more fully understood. Carrier 72, as shown in FIG. 12, will ring a six unit array of necked cans. Carrier 172, shown in FIG. 15, will ring a twelve unit array of necked cans. Carrier 272, shown in FIG. 21, will ring a four unit array of screw cap bottles. These carriers may be made of a flat sheet of paperboard punched and embossed with the structural features described herein. The carriers may be formed from paperboard web stock by a punching, slotting and scoring operations using a conventionally formed array of dies, for example by rotary die cutting of a continuous paperboard web, as is known in the art. The carriers are preferably made in the form of a continuous web 70, as shown in FIG. 3, with parting lines 92 scored in the web 70. The carriers may have squared corners, angled corners such as shown in FIG. 12, rounded corners as shown in FIG. 15 or other configurations, as desired.

Applicants have found that a coated natural craft board of high wet strength and good printability on one side is suitable for use in producing carriers 72, 172 and 272. The paperboard should be sufficient to maintain strength throughout the converting process, through distribution and on to the retail customer and ultimate user.

Applicants have found that paperboard having the following properties is suitable for producing the carriers of the invention.

TABLE 1

| Caliper | Basis Weight | Test Dry MD | CD | Taber Stiffness MD | CD | Mullen | App. Density |
|---|---|---|---|---|---|---|---|
| .030 | 108 | 735 | 780 | 880 | 770 | 203 | 3.60 |

The paperboard may be coated, for example by clay coating or other techniques suitable for receiving printing, or may be embossed or laminated by other conventional processes. A slip clay coating of the type used on white board or food grade board is suitable for applicants' process and web and makes a satisfactory surface for receiving printing, such as advertising or other product indicia.

Applicants' web may also include additional additives as known in the art, for example, additives imparting additional wet strength to the product to prevent it breaking down in the presence of water vapor or losing strength, for example, on being cycled into and out of refrigeration. These additives are conventional in the paper making art.

Applicants have found that the paperboard described above is highly suitable as an environmentally satisfactory carrier product since it readily looses integrity on immersion in water or on being exposed to the elements, for example, in a landfill. As a preferable method of disposal it may be readily incinerated.

Referring further to FIGS. 12, 15 and 21, it can be seen that applicants incorporate a series of scores 120 spaced circumferentially around apertures 96, 196 and 296. Scores 120 form a series of roughly rectangular tabs or fingers 122 that snap under the flange or chime 124 of a beverage container such as a can 60 or a screw capped bottle 260, as shown. These tabs 122 prevent loss of the container through the carrier 72 or 272 when the container is under the influence of its own weight. Surrounding the apertures 96, 196 and 296 are a series of circumferential rings 126, 128 which are formed by embossing the paperboard, for example, during diecutting, as known in the art. Details of rings 126, 128 are shown in FIGS. 11, 13 and 14. The rings 126, 128 form a plurality of concentric embossments in the shape of, corrugations which extend at least partially around the apertures 96, 196 and 296, as shown. It is preferred that the internal diameter of the adjacent or inner most surrounding ring 126 be less than the sum of twice the paperboard thickness and the container body diameter.

Further, it is preferred that the arrangement of the radial slots 120 forming the tabs 122 be as indicated in FIG. 20 to further strengthen the area between two opposed apertures 96, 196 or 296. As shown, slots 120 on adjacent apertures 96 are offset so that they do not extend along a common line. This reduces the tendency of a tear starting in a slot 120 to extend through an adjacent slot 120 into an adjacent aperture 96, leading to inadvertent removal of a beverage container. Further, slots 120 preferably terminate at a location spaced from inner ring 126, as shown in FIGS. 13 and 14. By spacing the terminus of slot 120 from ring 126, we have found that the embossed ring acts as a stop which resists the extension of slot 120 beyond ring 126 during the ringing process, and subsequently, thus maintaining the integrity and strength of the carrier 72, 172, 272. Further, the corrugation 126 increases the spring property of the carrier 72, 172, 272 to maintain contact between a container 60 and tabs 122. The second corrugation 128 increases the spring property. In addition, rings 126 and 128 further strengthen the carrier in the vicinity of the apertures 96, 196, 296 to add shear and torsional strength.

As shown in FIG. 21, as in the case with screw cap bottles 260 or cylindrical cans, for example, the areas between adjacent containers can be reinforced by an additional stiffening member 250 which adds rigidity to the carrier, as shown in 272.

FIG. 21 shows a modified carrier 272 which is sized to permit it to be used on arrays of containers such as screw top bottles 260. It will be appreciated by those skilled in the art that the apertures 296 are sized and spaced to permit cooperation with the neck of a screw top bottle 260 and tabs or walls 120 support the screw cap 297 of the bottles, as shown. If desired, the additional web 250 may be laminated with carrier 272 between finger hole apertures 294 to provide additional stiffness and strength to web 272, as shown. The additional strength and stiffness provided by ply 250 may be useful where heavy bottles, such as glass bottle pints or quarts, are carried by the carrier 272. In all other aspects the operation of carrier 272 and its method of installation is as described previously herein.

Referring now to FIGS. 16-19, a manually operated ringing device 200 is shown. Ringing device 200 has a framework 202 above which is mounted a roll 256 on which is wound a web 70 of carriers 72, as previously described. Web 70 is fed manually from roll 256 through a set of guides 204 mounted in the frame 202 of machine 200, as shown. Web 70 is inserted through guides 204 until the web abuts against stop 206, as shown in FIG. 18. Within the framework 202 of machine 200 are sidewalls 208 and a backwall 209, as shown, which act to position an array of beverage containers in machine 200. As shown, in FIG. 18, the device holds two six unit arrays of necked cans. As shown in FIG. 18, the arrays are separated by a wall 212 which terminates in a knife edge 214 in an upper extremity, as shown. Web 70 of carrier 72 is positioned by guides 204 and stop 206 to lie just above the upper extremities of beverage containers 60. Mounted at the upper portion of machine 200 is a fixed mount 216 having a pivot 218, as shown. Lever 220 is pivoted at pivot 218 as shown in FIG. 19 and is connected by an additional pivot 222 to a plate 224, as shown. Mounted in the lower side of plate 224 is a subordinate plate 226 on which are mounted a plurality of ringing strippers 210, as shown. Strippers 210 are mounted in an array to correspond to the array of beverage containers accumulated in device 200. Strippers 210 are spaced along a centerline forming a gap 230 as shown, which is positioned directly above knife edge 214.

To operate manual carrier installing machine 200, an array of containers 60 is placed into the machine manually and positioned by abutment against walls 208 and 209. Web 70 is manually advanced through guides 204 into an abutting relationship with stop 206. In this position parting lines 92 between adjacent carriers 72 in web 70 are located above knife edge 214 and at the upper edge of a secondary knife edge or shear 232, as shown. When the beverage containers 60 are in position and web 70 is fully advanced against stop 206, lever 220 is manually moved downwardly in a direction shown in FIG. 19.

Strippers 210 contact the surface of web 70 and press apertures 96 over the flanges or chimes of beverage containers 60 to engage the tabs 120 of carrier 72 with the flanges or chimes 124 of beverage containers 60, as shown in FIG. 11. Knife edge 214 separates the center parting line 92 between adjacent carriers 72 and shear 232 fractures the parting line 92 at the left edge of the array. The completed installed carriers 72 and arrays of containers 60 may then be manually removed from the machine 200 and the procedure can be repeated to produce additional arrays. It will be appreciated that this description is directed at producing two six unit arrays, but the same device could be used to produce twelve unit arrays by removing the center spacer 212 and knife edge 214 and by using a different spacing of strippers 210. In many cases it would be most convenient to have two separate stripping plates 226, one for a twelve unit array and one for two six unit arrays. As can be appreciated by one skilled in the art, the strippers 210 on the twelve unit array plate are arranged to match the spacing of a twelve unit carrier such as shown in FIG. 15. Alternatively, a carrier 172 having an additional gap at the center can be used without changing the spacing of strippers 210, if knife edge 214 is removed.

It will be appreciated by those skilled in the art that various changes and modifications can be made to the invention, as described herein, without departing from the spirit of the invention. Applicants are not to be restricted to the embodiments shown herein for purposes of illustration, but are to be limited only by the claims appended hereto and their equivalents.

We claim:

1. A carrier for a plurality of containers each formed with circumferentialy directed flanges, the carrier being formed of planar material in which apertures are formed, one for each container, each aperture being formed with a series of radially directed slits to define separate but closely positioned tab elements arranged around the inner periphery of each of the apertures and rendered displaceable from the plane of said planar material to assume separated flared positions which open said slits for supportingly engaging with the flanges of the containers placed in the carrier, and embossment formed in the planar material and extending at least partially around each said aperture to strengthen the tab elements and stiffen the planar material.

2. The carrier of claim 1 wherein the embossment in the planar material provides shear and torsional strength adjacent the container engaging tab elements as well as spring properties.

3. The carrier of claim 1 wherein a second embossment is formed to be concentric each of the apertures and extending at least partially around each aperture.

4. The carried of claim 1 wherein the slits arranged around the inner periphery of each of said apertures are offset so that the slits in adjacent apertures are out of radial alignment as between adjacent container receiving apertures.

5. The carrier of claim 1 wherine he container engaging means includes a plurality of circumferentially spaced tabs at the periphery of he apertures, and wherein the strengthening embossment extends at least partially around each of the apertures, the tabs being formed by radial slits extending toward the embossment but terminating at a location adjacent the embossment.

6. A carrier for an array of containers having flanged carrier engaging elements the carrier having a planar portion having container receiving apertures therein, the carrier having means for engaging containers at the periphery of the apertures, the container engaging means including a plurality of circumferentially spaced tabs at the periphery of the apertures, the tabe being formed by radially extending slots extending outwardly form the periphery of the apertures, the carrier including means for increasing the resiliency of the carrier and including means for strengthening the carrier in an area of the planar portion adjacent to eh container receiving apertures, the resiliency increasing and strengthening means including as plurality of corrugated rings extending at least partially around the apertures and the radial slots, the radial slots extending toward the innermost corrugated ring but terminating at a location spaced therefrom, the corrugated rings adding torsional and shear strength to the planar portion of the carrier and adding additional container engaging resiliency to the container engaging tabs.

* * * * *

UNITED STATES PATENT AND TRADEMARK OFFICE
CERTIFICATE OF CORRECTION

PATENT NO. : 5,125,506

DATED : June 30, 1992

INVENTOR(S) : Jerome J. Galbierz, Richard T. Galbierz and Michael L. Reinig

It is certified that error appears in the above-identified patent and that said Letters Patent is hereby corrected as shown below:

In the abstract, 3rd line from bottom "arry" should be "array"

Col. 4, line 68, "cams" should be "cans"

Col. 10, line 34, after "concentric" and before "each" insert --- to ---

Col. 10, line 36, "carried" should be "carrier"

Col. 10, line 41, "wherine" should be "wherein" and "he" should be "the"

Col. 10, line 43, "he" should be "the"

Col. 10, line 53, "tabe" should be "tabs"

Col. 10, line 55, "form" should be "from"

Col. 10, line 58, "eh" should be "the"

Signed and Sealed this

Fourteenth Day of September, 1993

Attest:

BRUCE LEHMAN

Attesting Officer

Commissioner of Patents and Trademarks